Patented Aug. 3, 1948

2,446,478

UNITED STATES PATENT OFFICE 2,446,478

IMITATION MAPLE FLAVOR

Roland E. Kremers, Summit, N. J., assignor to General Foods Corporation, New York, N. Y., a corporation of Delaware No Drawing. Application October 6, 1944, Serial No. 557,553

16 Claims. (Cl. 99—140)

This invention relates to an improved artificial maple flavor and syrup and to the process of making the same.

In the past, imitation maple flavors have been prepared by combining various extracts, oils, and essences with natural or synthetic esters, ketones, aldehydes, and the like. Though reminiscent of maple, the flavor of these concoctions is generally far removed from a true maple flavor. When such concoctions are used in syrups and the like, moreover, caramel is generally added to impart the desired color to the preparation, and the characteristic caramel flavor masks such of the maple flavor as these preparations contain.

One of the objects of the present invention is to produce an artificial flavoring material possessing a flavor of true maple character.

Another object is the production of an improved artificial maple flavoring material suitable for use in syrups and with food products in general.

A further object is the production of a stable, dry, water-soluble product suitable for tableting or for mixing with dry food preparations.

A still further object is the development, simultaneously with the maple flavor, of a color appropriate for a subsequently prepared maple syrup.

I have found that an excellent maple flavoring material results from causing certain alpha amino acids of 3 to 6 carbon atoms to react with a reducing saccharide, or precursor thereof, at a temperature ranging from about 100° C. to about 170° C. The structural formula for this group of acids can be represented as follows:

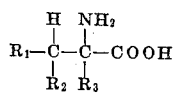

wherein $R_1$ may be H, OH, $CH_3$, or COOH, $R_2$ may be H or $CH_3$, and $R_3$ may be H or $CH_3$. This formula includes serine, α-amino-n-butyric acid, aspartic acid, alanine, threonine, valine, α-methyl-α-amino-n-butyric acid, and α-amino isobutyric acid, as well as six other theoretically possible α-amino acids which as far as I am aware at present have not yet been isolated or prepared but which would be operative in my process in view of their molecular structure.

Of the eight acids named above, those most effective in producing intensity and veracity of maple flavor are serine, threonine, α-methyl-α-amino-n-butyric acid, α-amino isobutyric acid, and α-amino-n-butyric acid, the latter being preferred at present. Other amino acids such as nor-valine and nor-leucine sometimes give flavors barely reminiscent of maple, but not sufficiently maple in character to have practical utility as maple flavors, while still others such as proline and phenylalanine give rise to bitter off-flavors. Also some amino acids, for example, glycine, promote objectionable caramelization which masks the delicate maple flavor and their use should be avoided. Likewise some impurities commonly associated with the amino acids, e. g., ammonium salts, may promote caramelization and such impurities if present should be removed by appropriate preliminary treatment.

The desired amino acid may be reacted with any suitable reducing saccharide, i. e., a saccharide capable of reducing Fehling's solution to give cuprous oxide, or with any suitable precursor thereof which expression includes all saccharides and other materials that provide a reducing saccharide or saccharides under the conditions of the reaction. These precusor materials consist mainly of those di- and polysaccharides which undergo molecular cleavage to yield reducing saccharides, such as the disaccharide, sucrose; the trisaccharide, raffinose; the polysaccharide material, dextrin, which of itself comprises both reducing saccharides and precursors thereof; etc. The reducing saccharides include all monosaccharides, disaccharides of the gentiobiose type, the trisaccharide manninotriose, etc. In addition, certain saccharic materials can be used which are derived from or closely related to the monosaccharides and have similar reducing properties, such as the "-uronic" acid, galacturonic acid; the desoxy sugar, rhamnose; and the penta-acetate of galactose. Thus the term "reducing saccharide" as used in the claims will be understood to include all of the reducing saccharide and saccharic compounds and precursors which provide reducing saccharide or saccharic compounds under the conditions of the reaction by degradation of the molecule or in any other manner.

In all of my tests so far, I have found it necessary, in order to achieve the development of maple flavor, to carry out the reaction under such conditions as to effect a substantially anhydrous molten state of the reaction mixture at least at the later stages of the reaction. It is my belief that the development of maple flavor depends upon a high degree of molecular contact between the reactants and that water, therefore, can not be present in such proportions as to preclude a substantially anhydrous molten state of the reaction mixture at the end of the reaction. However, the term "substantially anhydrous" is not meant to exclude the presence of some water in solution. In fact, a small amount of water is formed continuously during the course of the reaction, which fact alone is sufficient to preclude a completely anhydrous molten state at the end of the reaction. No analytical methods are available which permit determining with accuracy the maximum amount of water permissible at the end of the reaction. Good results have been obtained when the end product at the reaction temperature contained sufficient moisture to render it more or less tacky in nature, and I believe that as much as 5–10% moisture may have been present in some of such cases. These figures can not be determined definitely, however, and in practice it is satisfactory to observe the rule that the product upon cooling to room temperature is substantially solid and substantially dry to the touch. The term "substantially anhydrous" is to be understood to include the presence of moisture within this limitation.

It is possible to obtain the liquid state required to effect the reaction by direct fusion of the reactants. However, since many of the useful saccharide materials and amino acids melt at excessively high temperatures, it will often be necessary to employ enough water at the start to effect solution of the reaction mixture. As the reaction progresses, in an open system, this water substantially evaporates with eventual production of the substantially anhydrous molten state described above, probably due to the accumulated amount of reaction product obtained in the wet reaction and the attendant lowering of the fusion point of the mixture.

Despite such use of water, difficulty may still be encountered in effecting ultimate fusion with some pure saccharide materials such as dextrose, and in such cases a mixture of two or more saccharide materials may be used.

I prefer to employ saccharide mixtures because their use facilitates the ultimate fusion and reduces to a minimum the formation of insoluble matter. When using such mixtures, it is necessary that at least one of the saccharide components be a reducing saccharide or precursor thereof, and preferably the mixture should be composed largely of reducing saccharides. For these reasons and also because of their low cost and bland flavor, saccharide mixtures such as corn syrup and malt syrup are excellently suited for use in the process, although other readily available saccharide mixtures such as invert sugar are also suitable. Corn syrup, for example, contains a large proportion of reducing sugars, namely, dextrose and maltose, while malt syrup consists mainly of maltose, as shown by the following typical analyses:

|  | Corn Syrup | | Malt Syrup | |
| --- | --- | --- | --- | --- |
|  | Percent d. b. | Percent w. b. | Percent d. b. | Percent w. b. |
| Dextrose | 21.3 | 17.8 | 7.9 | 6.5 |
| Maltose Monohydrate | 36.9 | 20.9 | 66.1 | 54.2 |
| Total Sugars as Dextrose | 98.0 | 82.0 | 96.2 | 78.9 |
| Total Nitrogen | 0.04 | 0.03 | 0.29 | 0.24 |
| Direct Ash | 0.27 | 0.23 | 0.82 | 0.67 |
| Sulfated Ash | 0.54 | 0.45 | 1.30 | 1.07 |
| Lead Number | 1 | 1 | 16 | 16 |
| Sucrose | None | None | None | None |
| Levulose Hydrated | None | None | 0.5 | 0.4 |

The temperature range of 100–170° C. is determined on the one hand by the incidence of the maple development and on the other hand by excessive caramelization. At about 100° C. and below, a reaction takes place as evidenced by the development of a brown color, but there is no development of maple flavor. At about 170° C. and above, on the other hand, caramelization takes place too rapidly for satisfactory results. Within this range, however, products can be obtained with good maple flavor and color, provided the reaction is not allowed to proceed so long that undue caramelization results.

The behavior of the reaction indicates that there may be two competing reactions, the one responsible for the maple flavor being more rapid in the prescribed temperature range than the caramelization reaction. Both reactions appear to be accelerated as the temperature increases, but the rate of caramelization increases more rapidly until at about 170° C. it becomes equal to or greater than the rate of maple flavor development. Thus the optimum reaction time to obtain high flavor intensity without undue caramelization becomes shorter as the temperature increases. For example, when α-amino-n-butyric acid is reacted with dextrose, a flavor concentrate of high intensity and without undue caramelization is obtained in two hours at 120° C., in one hour at 130° C. and in 10–20 minutes at 145° C. Since longer reaction periods facilitate control of the reaction, it is generally preferred to use lower temperatures for longer periods.

The temperature and time of reaction also depend on the nature of the reactants, particularly the saccharide. For example, the greater reactivity of the monosaccharides makes possible the use of lower temperatures without requiring excessive heating periods, whereas in the case of the less reactive disaccharides it is desirable to employ higher temperatures.

The useful saccharide materials can be divided into the following groups according to the preferred temperature ranges of the reaction, although it will be understood that the stated limits of these preferred ranges are not necessarily the minimum or maximum temperatures at which some useful results can be secured.

1. The pentoses, including aldopentoses, methyl pentoses, ketopentoses, etc. Examples are xylose, arabinose, and rhamnose. For this group, the preferred temperature range of the reaction is from 100° C. to about 130° C.

2. The hexoses and reducing polysaccharides. In common with the pentoses of group 1, these reducing saccharides of group 2 have reactive aldehyde or ketone groups which are free to participate directly in the reaction with the amino acids, but are less reactive than the pentoses so that the preferred temperature range for the reaction is approximately from 120° C. to 150° C. Examples are the aldohexoses such as glucose, galactose and mannose; the ketohexoses such as levulose and sorbose; reducing disaccharides such as lactose and maltose and other disaccharides of the gentiobiose type; the reducing trisaccharide manninotriose; etc. With this group may also be classified saccharide mixtures such as corn syrup and malt syrup which contain both dextrose and maltose, and invert sugar which contains dextrose and levulose. In addition such saccharic materials as galacturonic acid and the penta-acetate of galactose can be used in this temperature range.

3. Non-reducing polysaccharides which are precursors of reducing saccharides, as explained above. In this group, the temperature must be high enough in the first place to cause the formation of the reducing saccharide, and the preferred temperature range is approximately 140° C. to 170° C. Examples are the polysaccharides sucrose, dextrin and raffinose.

Within these preferred ranges, the time of the reaction for any given saccharide varies inversely with the temperature of the reaction, and also to some extent with different individual members of each group. In general, the reaction time desirable to develop good maple flavor in any of the above groups will not exceed about two hours at the low temperature end of the range for that group, and at the high temperature end of such range it may be reduced to a few minutes as indicated by the above example of the reaction between α-amino-n-butyric acid and dextrose. Temperatures below the preferred ranges are not desirable because, even though the desired reaction may take place slowly, the prolonged heating required to develop a satisfactory product would be not only unnecessary but also objectionable from the practical standpoint.

The exact nature of the chemical reactions which take place in the process are complex and obscure, and the particular compound or compounds responsible for the maple flavor have not yet been identified. As compared with prior imitation maple flavors, however, the product of the reaction has a truer maple flavor that is very close to that of pure maple syrup. It is completely soluble in water, without the addition of alcohol, and can be prepared in the form of a dry solid that is satisfactory for tableting or incorporation into dry food preparations such as ice cream and pudding mixes. Also it is possible to package the reaction product, with or without further processing, in cheaper and more convenient containers. Moreover, when added to simple syrups and like media, the reaction product contributes a color which is a truer reproduction of the color of maple syrup. As this color is produced at the same time and in the same reaction medium as the flavor, the need for incorporation of a separate color is eliminated, the introduction of the bitter flavor of the commonly used caramel coloring materials is avoided, etc.

The following examples illustrate several embodiments of the invention, but it is to be understood that these examples are for purposes of illustration and that the invention is not limited thereto, since various changes can be made by those skilled in the art without departing from its scope and spirit.

*Example 1*

Ten grams of corn syrup were placed in a round aluminum dish, 7 centimeters in diameter and 3 centimeters high. To this was added ½ gram of α-amino-n-butyric acid which has been thoroughly ground with 2 grams of sucrose until both ingredients were very finely comminuted. The whole was then heated to about 80° C. and stirred for 5 to 10 minutes to disperse the solid ingredients in the syrup. The mixture was spread as evenly as possible over the bottom of the dish, the thickness of the reaction mass being about 2 to 3 mm., and the dish was then placed in a rotating hearth oven maintained at 130° C. In about 4 to 5 minutes, the syrup began to boil; in 10 to 12 minutes, it had turned brown; and in 12 to 15 minutes, a foam started to rise. At the end of 30 minutes, the foam was slightly above the top of the container, but a negligible amount ran over the sides. At the end of 45 minutes, the foam had dried out and hardened. At the end of one hour, the material was removed from the oven, allowed to cool, removed from the dish, and comminuted. In the roasting process, the loss in weight of the mixture was about 25% of the original weight.

The comminuted product was used in the preparation of an imitation maple syrup as described in Example 3.

*Example 2*

One hundred grams of α-amino-n-butyric acid and 2,000 grams of corn syrup were mixed in a Baker-Perkins Mixer at a temperature not exceeding 55° C. until the acid was thoroughly dispersed in the syrup. The mixer was then closed with a vacuum-tight cover and evacuated to an absolute pressure less than 20" of mercury. A trap immersed in a salt-ice freezing mixture was inserted between the mixer and the source of vacuum in order to permit the condensation and measurement of the distillate, and the mixture was then boiled under reduced pressure until the rate of aqueous condensation in the trap decreased to less than 1 cc. per minute. By this time, the temperature of the mixture had been raised to about 105° C. The mixer was then restored to atmospheric pressure and the temperature of the mixture raised to 110–120° C. within 10 to 15 minutes. These procedures resulted in the removal of essentially all the water from the mixture without causing a large flavor change. The maple flavor was then fully developed by maintaining the temperature of the mixture between 120 and 130° C. for from 40 to 55 minutes. At the end of this period, the contents of the mixer were poured onto a cooling slab in order to cool the product rapidly.

Other methods of incorporating the α-amino-n-butyric acid into the corn syrup include dissolving the amino acid in water and subsequently incorporating the aqueous solution into the syrup, and introducing the amino acid into the syrup in the form of a thoroughly ground mixture with about twice its weight or more of sucrose, the latter facilitating the grinding operation.

The use of reduced pressure to hasten the evaporation of any water present is generally preferable in carrying out the reaction on a large scale, whereas the normal pressure of an open system is satisfactory for small scale operations. Greater than atmospheric pressure is usually undesirable because certain volatile by-products of the reaction, which would ordinarily evaporate, are retained and tend to impart off-flavors to the reaction product.

*Example 3*

An imitation maple syrup was prepared from the product of either Example 1 or 2 by combining 2.35 grams of said product with 262 grams of cane sugar, 0.15 gram of sodium chloride, 0.009 gram of vanillin, and 131.5 ml. of water to give 396 grams (300 ml.) of a syrup of pronounced maple character.

Vanillin was added to the above imitation maple syrup since it is known to occur in maple sap and its use in combination with the reaction product results in a superior syrup, though its presence is not essential. Instead of vanillin, of course, I may use any vanilla flavoring material, as, for example, a vanilla extract.

Example 4

A mixture of 0.2 g. α-amino-n-butyric acid and 0.8 g. xylose was ground in a mortar, placed in a 25 x 150 mm. test tube, and heated for 5 minutes in an oil bath maintained at 130° C. The material fused quickly, turned dark brown, and foamed during this period. The product was removed, ground, and dissolved in a 66° Brix sucrose syrup. The syrup had a maple flavor.

Example 5

A mixture of 0.2 g. α-amino-n-butyric acid and 0.8 g. glucose was ground in a mortar, placed in a 25 x 150 mm. test tube and immersed for 60 minutes in an oil bath maintained at 130° C. The mixture fused, slowly darkened, foamed, and lost water during this period. The product was removed, ground, and dissolved in a 66° Brix sucrose syrup, imparting to the latter a pronounced maple flavor.

Example 6

A mixture of 0.2 g. α-amino-n-butyric acid and 0.2 g. sucrose was ground in a mortar and transferred to a 25 x 150 mm. test tube. One g. of malt syrup was added and the solid was thoroughly dispersed in the syrup by stirring. The tube was immersed for 60 minutes in an oil bath maintained at 130° C. The product was removed, ground, and dissolved in a 66° Brix sucrose syrup, imparting to the latter a definite maple flavor.

Example 7

A mixture of 0.2 g. α-amino-n-butyric acid and 1.4 g. maltose was ground in a mortar and placed in a 25 x 150 mm. test tube. The latter was immersed for 60 minutes in an oil bath maintained at 140° C. The product was removed, ground, and dissolved in a 66° Brix sucrose syrup, imparting to the latter a pronounced maple flavor.

Example 8

A mixture of 0.2 g. α-amino-n-butyric acid and 1.4 g. sucrose was ground in a mortar and placed in a 25 x 150 mm. test tube. The tube was immersed for 60 minutes in an oil bath maintained at 160° C. The product was removed and dissolved in water, imparting to the latter a flavor of maple character.

Example 9

A mixture of 0.2 g. of α-amino isobutyric acid and 0.2 g. of sucrose was ground in a mortar and stirred into 1 g. of corn syrup contained in a 25 x 150 mm. test tube. The tube was immersed for 60 minutes in an oil bath maintained at 130° C. The product was removed, ground, and dissolved in sucrose syrup, imparting to the latter a maple flavor.

Example 10

A mixture of 0.2 g. α-amino-α-methyl butyric acid and 0.2 g. sucrose was ground in a mortar and transferred to a 25 x 150 mm. test tube. One gram of corn syrup was added and the solid was thoroughly dispersed in the syrup by stirring. The tube was immersed for 60 minutes in an oil bath maintained at 130° C. The product was removed, ground, and dissolved in a 66° Brix sucrose syrup, imparting to the latter an aromatic maple-like flavor.

Example 11

A mixture of 0.2 g. serine and 0.2 g. sucrose was ground in a mortar and transferred to a 25 x 150 mm. test tube. One gram of corn syrup was added and the solid was thoroughly dispersed in the syrup by stirring. The tube was immersed for 60 minutes in an oil bath maintained at 130° C. The product was removed, ground and dissolved in a 66° Brix sucrose syrup, imparting to the latter a maple flavor.

Example 12

A mixture of 0.2 g. threonine and 0.2 g. sucrose was ground in a mortar and transferred to a 25 x 150 mm. test tube. One gram of corn syrup was added and the solid thoroughly dispersed in the syrup by stirring. The tube was immersed for 60 minutes in an oil bath maintained at 130° C. The product was removed, ground, and dissolved in a 66° Brix sucrose syrup, imparting to the latter a maple flavor.

Example 13

A mixture of 0.2 g. valine and 0.7 g. levulose was ground in a mortar and transferred to a 25 x 150 mm. test tube. The tube was immersed for 60 minutes in an oil bath maintained at 130° C. The product was removed and dissolved in water, imparting to the latter a flavor of maple character.

Example 14

A mixture of 0.2 g. α-amino isobutyric acid and 0.8 g. glucose was ground in a mortar and transferred to a 25 x 150 mm. test tube. The tube was immersed for 60 minutes in an oil bath maintained at 130° C. The product was removed and dissolved in water, imparting to the latter a flavor of maple character.

Example 15

A mixture of 0.2 g. serine and 0.7 g. levulose was ground in a mortar and transferred to a 25 x 150 mm. test tube. The tube was immersed for 60 minutes in an oil bath maintained at 130° C. The product was removed and dissolved in water, imparting to the latter a flavor of maple character.

Example 16

A mixture of 0.2 g. α-amino-n-butyric acid and 0.2 g. sucrose was ground in a mortar and transferred to a 25 x 150 mm. test tube. One gram of invert syrup was added and the solid was evenly dispersed in the syrup by stirring. The tube was immersed for 60 minutes in an oil bath maintained at 130° C. The product was removed, ground, and dissolved in a 66° Brix sucrose syrup, imparting to the latter a maple flavor.

Maple flavoring material embodying the invention may also be used in food products other than syrup and in which maple flavor may be desired, either during their manufacture for commercial distribution or during their preparation in the kitchen. For example, it may be added in dry form to prepared pancake flours and like products to provide maple flavor in the food when prepared for consumption.

The procedures of the foregoing examples are generally usable with other reactants, with modification when necessary of the conditions of temperature and time to effect optimum results as indicated above. However, it should be clearly understood that the invention is in no way limited to these particular procedures especially as regards the mechanical means of carrying out the process. Variations in the mechanical set-up may entail minor changes in time and temperature to achieve substantially the same maple development. Other variations in the proportions, de-

What is claimed is:

1. The process of producing a maple flavor which comprises reacting, at a temperature in the approximate range of 100° C. to 170° C., a reducing saccharide with an amino acid of the general formula

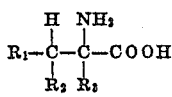

wherein $R_1$ is H, OH, $CH_3$, or COOH, $R_2$ is H or $CH_3$, and $R_3$ is H or $CH_3$, the reaction mixture being in a substantially anhydrous molten state at least at the end of the reaction and the duration of the reaction varying inversely with the temperature and being limited at a given temperature to avoid caramelization masking the maple flavor of the reaction product.

2. The process of claim 1, in which the reaction mixture is dissolved in an amount of water such as to be substantially evaporated during reaction with eventual production of a substantially anhydrous molten state of the reaction mixture at least at the end of the reaction.

3. The process of claim 1, in which the reaction mixture is dissolved in an amount of water such as to be substantially evaporated during reaction with eventual production of a substantially anhydrous molten state of the reaction mixture, and in which the evaporation of the water is effected under reduced pressure.

4. The process of claim 1, in which the saccharide reactant is part of a mixture of saccharides.

5. The process of claim 1 in which the amino acid is α-amino-n-butyric acid.

6. The process of producing a maple flavor which comprises reacting, at a temperature in the approximate range of 100° C. to 130° C., a pentose with an amino acid of the general formula set forth in claim 1, the reaction mixture being in a substantially anhydrous molten state at least at the end of the reaction and the duration of the reaction varying inversely with the temperature and being limited to avoid caramelization masking the maple flavor of the product.

7. The process of claim 6 in which the pentose is xylose.

8. The process of claim 6 in which the pentose is xylose and the acid is α-amino-n-butyric acid.

9. The process of producing a maple flavor which comprises reacting, at a temperature in the approximate range of 120° C. to 150° C., an acid of the general formula set forth in claim 1 with a reducing saccharide of the group consisting of hexoses and reducing polysaccharides, the reaction mixture being in a substantially anhydrous molten state at least at the end of the reaction and the duration of the reaction varying inversely with the temperature and being limited to avoid caramelization masking the maple flavor of the product.

10. The process of claim 9 in which the reducing saccharide is dextrose.

11. The process of claim 9 in which the reducing saccharide is dextrose and the acid is α-amino-n-butyric acid.

12. The process of producing a maple flavor which comprises reacting, at a temperature in the approximate range of 140° C. to 170° C., an acid of the general formula set forth in claim 1 with a non-reducing polysaccharide which is a precursor of a reducing saccharide formed under the reaction conditions, the reaction mixture being in a substantially anhydrous molten state at least at the end of the reaction and the duration of the reaction varying inversely with the temperature and being limited to avoid caramelization masking the maple flavor of the product.

13. The process of claim 12 in which the non-reducing saccharide is sucrose.

14. The process of claim 12 in which the non-reducing saccharide is sucrose and the acid is α-amino-n-butyric acid.

15. The maple flavoring material produced by the process of claim 1.

16. An imitation maple syrup containing the maple flavoring material produced by the process of claim 1.

ROLAND E. KREMERS.

REFERENCES CITED

The following references are of record in the file of this patent:

UNITED STATES PATENTS

| Number | Name | Date |
|---|---|---|
| 2,078,215 | Allen | Nov. 22, 1935 |
| 2,103,495 | Ruckdeschel | Dec. 28, 1937 |
| 2,179,203 | Stein et al. | Nov. 7, 1939 |

FOREIGN PATENTS

| Number | Country | Date |
|---|---|---|
| 107,367 | Great Britain | Mar. 18, 1918 |